United States Patent [19]

Moran et al.

[11] 4,095,120
[45] June 13, 1978

[54] LOAD CONTROL FOR WIND-DRIVEN ELECTRIC GENERATORS

[75] Inventors: Kevin E. Moran, Riverton; Eugene C. Korzeniewski, Willingboro, both of N.J.

[73] Assignee: Louis Michael Glick, Cumberland, Md.

[21] Appl. No.: 735,003

[22] Filed: Oct. 22, 1976

[51] Int. Cl.² ............................................. H02P 9/04
[52] U.S. Cl. ........................................ 290/44; 290/55; 322/35
[58] Field of Search .................. 290/43, 44; 322/35

[56] References Cited

U.S. PATENT DOCUMENTS

| | | | |
|---|---|---|---|
| 1,366,844 | 1/1921 | Snee | 290/44 |
| 1,778,793 | 10/1930 | Constantin | 290/44 |
| 2,152,576 | 3/1939 | Weeks | 290/44 |
| 2,178,679 | 11/1939 | Claytor | 322/35 |
| 3,974,395 | 8/1976 | Bright | 290/44 |

*Primary Examiner*—Robert K. Schaefer
*Assistant Examiner*—John W. Redman
*Attorney, Agent, or Firm*—Smith, Harding, Earley & Follmer

[57] ABSTRACT

A generator load curve is precisely matched to a wind-driven motor characteristic by means of a rotor speed-responsive tachometer effecting stepwise control of field current in the generator. Several variations of the tachometer circuit are described. Field current is controlled by an amplifier, and voltage regulation is effected by an override circuit disabling the amplifier.

14 Claims, 6 Drawing Figures

LOAD CONTROL FOR WIND-DRIVEN ELECTRIC GENERATORS

BRIEF SUMMARY OF THE INVENTION

In generating electric power by means of wind-driven generators, it is difficult to attain optimum efficiency because of a combination of factors. First, wind speed always varies unpredictably. Secondly, typical generator load curves are imcompatible with the characteristic curves of typical wind-driven rotors. As a result, a simple system in which a wind-driven rotor is arranged to drive a generator is, at best, optimally efficient only at one particular wind velocity.

It can be shown, for example, that, using a given alternator having a constant field excitation in combination with a multiple-blade wind-driven rotor, if the rotor diameter is relatively large, the generating efficiency of the system approaches a maximum as wind speed increases from zero to a given velocity, and efficiency then drops off with further increases in speed. On the other hand, if the size of the rotor blades, or the number of blades, is decreased, a condition is reached where the torque produced by the wind-driven rotor is insufficient to overcome the load presented by the generator. When this occurs, the generator cannot increase in speed as wind speed increases. Consequently, generator speed is necessarily low, and the system cannot take advantage of the increased power available in high winds. In either case, the rotor-generator system is inefficient because it does not take full advantage of available wind power at all times.

Some recognition has been given in the past to the foregoing problems, as demonstrated, for example, by the following U.S. Pat. Nos.: 2,339,749, issued Jan. 25, 1944 to J. R. Albers; 2,178,679, issued Nov. 7, 1939 to E. M. Claytor; 1,366,844, issued Jan. 25, 1921 to J. A. Snee, Jr.; 2,148,804, issued Feb. 28, 1939 to E. M. Claytor; 1,142,538, issued June 8, 1915 to J. A. Snee, Jr. et al.; 2,470,797, issued May 24, 1949 to P. H. Thomas; and 2,360,792, issued Oct. 17, 1944 to P. C. Putnam. The foregoing patents propose various sytems for improving the performance of wind-driven generators by correlating the power requirements of the generators to the power output characteristics of wind-driven rotors.

Claytor U.S. Pat. No. 2,179,679 is of particular interest because it describes a wind-driven generator control system which switches shunt resistors in and out of the field circuit in accordance with wind speed, in order to produce a modified generator loading curve which approximates the locus of the peaks of the propeller curves.

Albers U.S. Pat. No. 2,339,749 is also of interest in that it describes a system in which field current is controlled through a resistance varied by means of governor-operated cam so that, as rotor speed increases, resistance is gradually increased, then decreased. The system of Albers is at least theoretically capable of producing a better match between the generator load curve and the rotor curve for the reason that field current is controlled in accordance with rotor speed rather than directly by wind speed as is the case in Claytor. Where control is attempted in accordance with wind speed, matching of the curves is imperfect because wind speed and rotor speed correspond to each other only under steady-state conditions. The theoretically perfect matching achieved by the mechanical system of Albers has not been achieved heretofore in systems with non-mechanical speed sensing.

The present invention constitutes an improvement over the systems described by Claytor, Albers and the others in several important respects. One object of the invention is to achieve improved performance in terms of the efficiency of operation by providing more precise matching of the rotor and generator curves than is achieved by Claytor. Another object is to provide precise matching of the rotor and generator curves over a wide range of rotational speeds. Another object of the invention is to achieve such precise matching at a low cost by the use of an all-electronic system rather than a mechanical one. Another object of the invention is to provide a novel matching system incorporating voltage regulation. Still another object of the invention is to provide a matching system having novel and improved sensing means for determining rotor speed.

The principal building blocks of the invention are the generator speed sensor and the generator field current control, which is responsive to a signal produced by the speed sensor.

The speed sensor establishes at least four contiguous speed ranges which together consitute a wide range of rotational speeds. For each of the speed ranges into which the wide range is divided, the speed sensor establishes a predetermined amplitude for its output signal. The speed sensor is capable of different signal amplitudes for adjacent speed ranges. However, because the ultimate purpose of the apparatus is to match the load curve of the generator to the available wind power, in some cases it is necessary to produce a field current which does not vary monotonically with generator speed. The sensing means is therefore designed so that, with a proper choice of components, any desired signal amplitude can be produced for any given one of the generator's speed ranges. Thus, while the signal amplitudes for adjacent speed ranges are different, it is entirely possible for two separated speed ranges to be assigned identical signal amplitudes. The foregoing objective is preferably achieved by utilizing a source of constant voltage together with a resistive dropping network having a plurality of selectable resistors. Selected resistors are connected into the dropping network in accordance with generator speed.

The preferred way of selecting resistors for connection into the dropping network is to generate a pulse train the repetition rate of which is proportional to generator speed, and to count the number of pulses occurring in a predetermined time interval. Counting is carried out repetitively for successive time intervals, and selective switching of resistors is controlled by a register which holds a count, established in a first time interval, temporarily until a new count is established in a subsequent time interval.

Another way of selecting resistors is to utilize an array of analog voltage comparators together with a tachometer circuit which establishes a varying d.c. voltage which increases with increasing generator speed. The comparators effect connection of appropriate resistances into the dropping network in dependence on generator speed.

The pulse train which is counted or the varying d.c. voltage which is delivered to the analog voltage comparators is derived in either of two ways.

In one alternative, an amplifier having a high input impedance is connected to one of the phase windings in the generator stator. When the generator armature rotates, an a.c. signal is produced in the stator. This a.c. signal is present even when the field is not energized (which is preferably the case at very low speeds), as a result of residual magnetization in the armature core. The a.c. signal is amplified by the high-impedance amplifier, and the amplifier output is either used to produce a pulse train for counting, or to produce a varying d.c. signal for delivery to an array of analog comparators.

In another alternative the magnetic pick-up is positioned adjacent the fins of the generator's cooling fan. The fins of the cooling fan are unevenly spaced in order to avoid a "siren" effect, but this produces a non-uniform pulse train at the output of the magnetic pick-up. A prescaling counter operates on the output of the magnetic pick-up to produce a uniform train of pulses for counting. The prescaling counter may also be used in conjunction with the array of analog voltage comparators.

The control means, the other principal building block of the invention comprises an amplification circuit connected to receive the signal produced by the sensing means. The output of the amplification circuit is connected to deliver current to the field winding. By utilizing an amplification circuit to control field current together with a plurality of selectable resistors in a voltage dropping network, it is a very simple matter to utilize any number of selectable resistors to determine the number of steps deemed necessary to achieve the required degree of precision in matching generator loading to available wind power. It is also a simple matter to make empirically derived adjustments in resistor values by first using variable resistors ("potentiometers"), making adjustments in their resistances and then choosing fixed resistors with corresponding values. In summary the control means in accordance with the invention makes it very easy to achieve very precise matching.

Other objects of the invention and further details and advantages will be apparent from the following detailed description when read in conjunction with the drawings.

Figure 1:
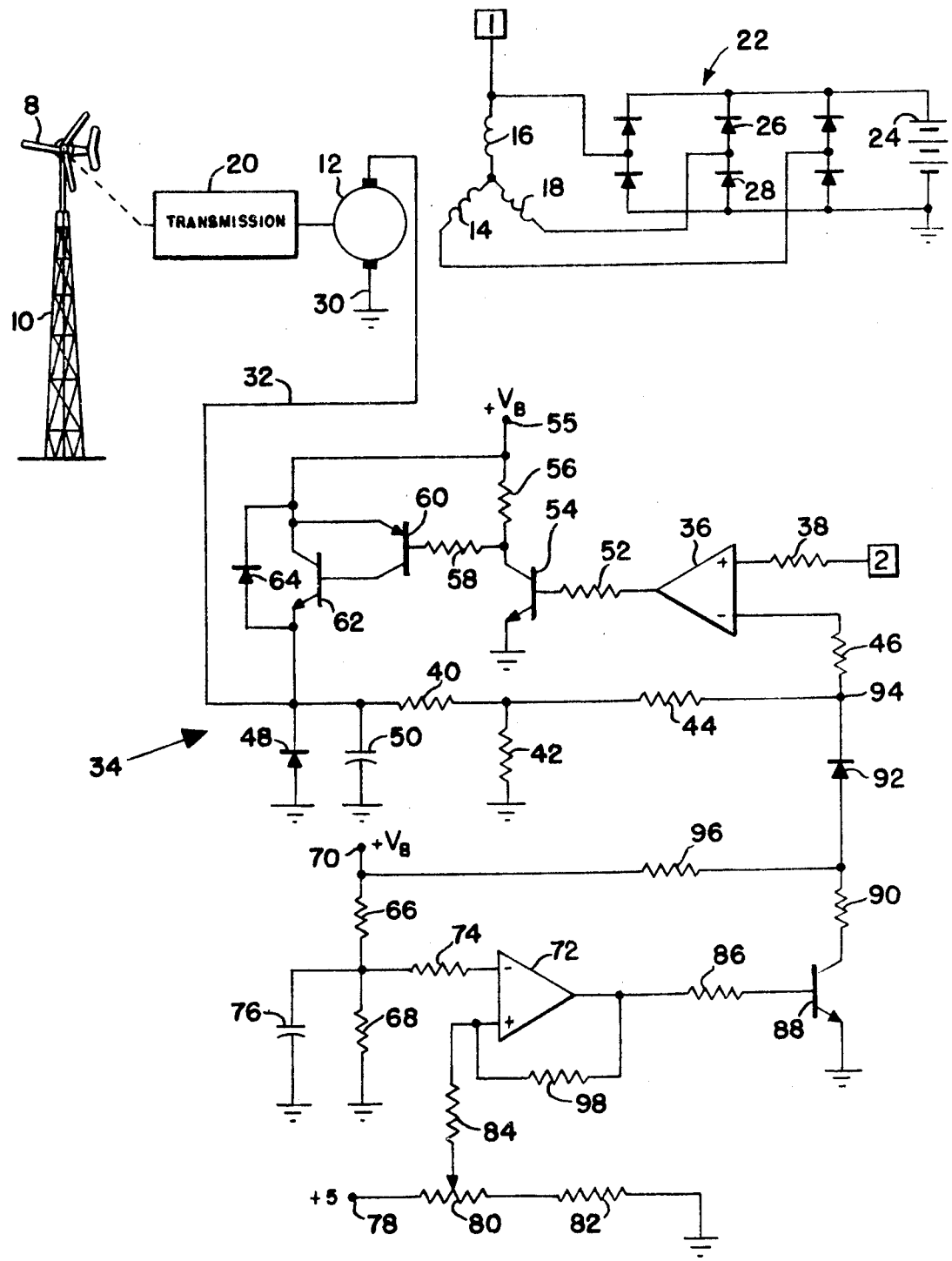
FIG. 1 is a schematic diagram showing a wind-driven generator together with a control circuit for controlling field current in the generator.
Figure 2:
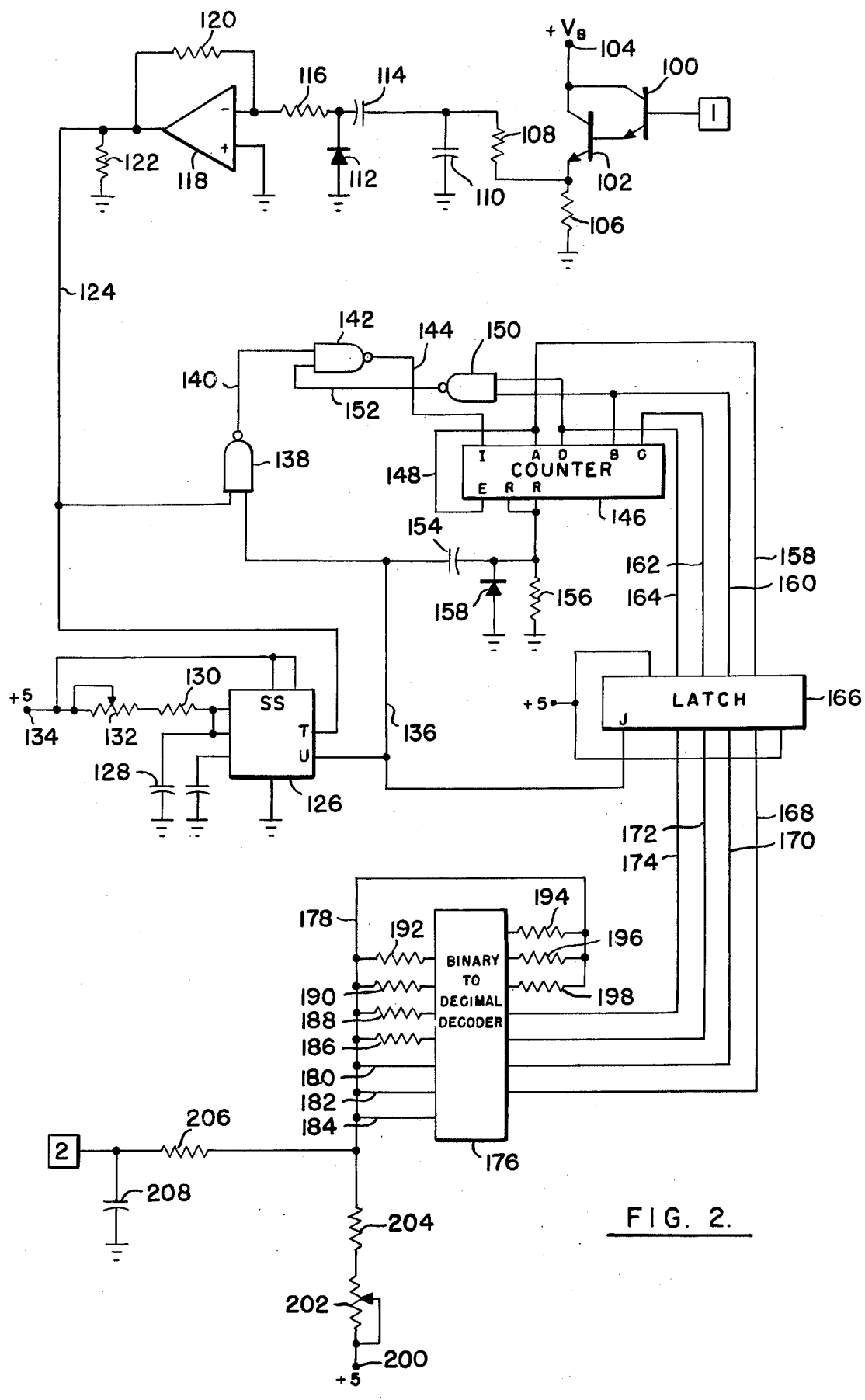
FIG. 2 is a schematic diagram of a circuit for sensing generator speed and providing a signal the amplitude of which varies as a function of generator speed, in which generator speed is sensed by counting pulses derived from an armature winding of the generator.
Figure 3:
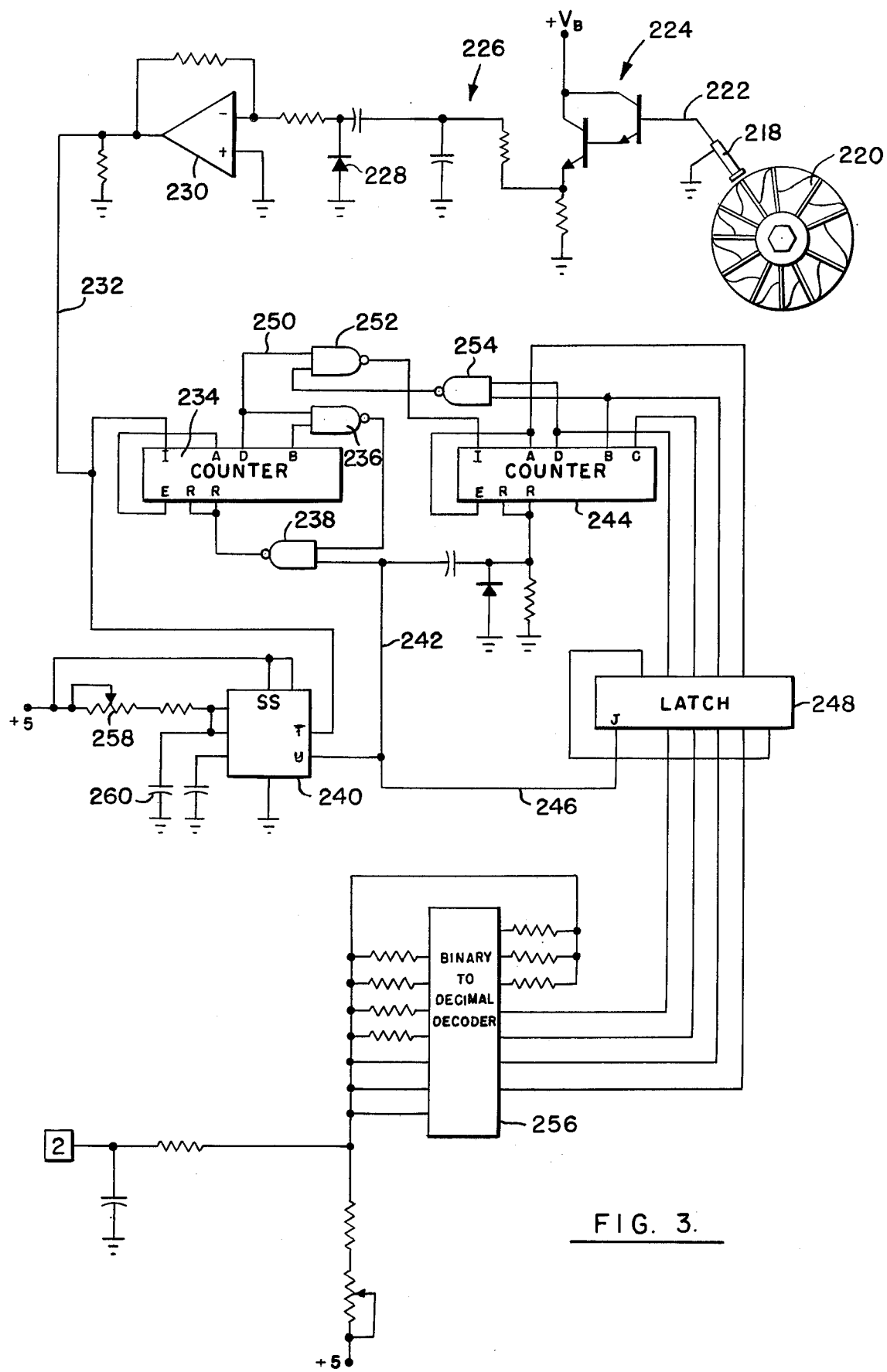
FIG. 3 is an alternative to the circuit of FIG. 2, in which pulses derived from a magnetic pick-up are counted.
Figure 4:
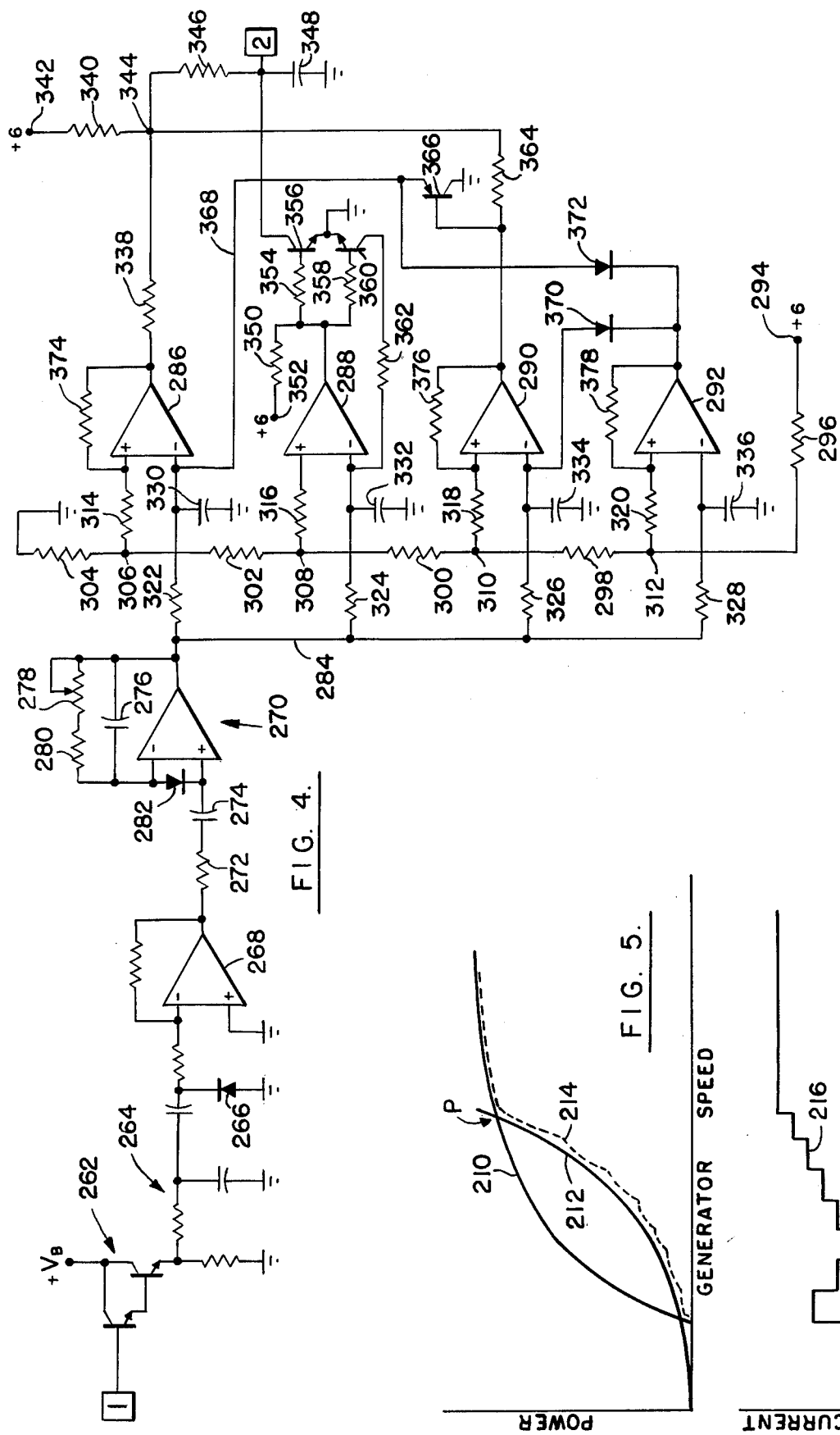
FIG. 4 is a schematic diagram of another alternative to the circuit of FIG. 2, in which an input is derived from the generator armature, and an output is produced by an array of comparators.

The circuit of FIG. 1 can be used in conjunction with any one of the circuits of FIGS. 2, 3 and 4. Interconnections are made by connecting correspondingly numbered interconnection terminals (blocks 1 and 2). When the circuit of FIG. 3 is used, only interconnection terminals 2 are connected.

Detailed Description

FIG. 1 shows a three-bladed wind-driven rotor supported atop a tower 10. The rotor is preferably of the type described in the copending application of Kevin E. Moran, Ser. No. 676,535, Filed Apr. 12, 1976. While, as shown in the Moran application, the generator is supported atop the tower with the rotor and driven by the rotor through a belt, the generator in FIG. 1 is illustrated schematically by rotor 12 together with a set of three armature windings 14, 16 and 18, interconnected in a Y cofiguration. The generator rotor 12 is driven by wind-driven rotor 8 through a transmission 20, which may be a belt, or gearing, or some other form of mechanical power transmission. The generator is typically a three-phase, seven pole device, resembling a conventional automotive alternator. The armature windings are connected through an array 22 of diodes to a storage battery 24 for charging the same. As shown, each of the armature windings is connected through a first diode to the positive terminal of batter 24 and through a second diode to the negative terminal of the battery, the diodes being connected in appropriate directions to effect proper charging of the battery and to prevent discharge. Thus, for example, winding 18 is connected through diode 26 to the positive battery terminal and through diode 28 to the negative battery terminal. In addition to its being connected through diodes to battery 24, winding 16 is also connected to interconnection terminal 1.

Field current is delivered to rotor 12 through a pair of brushes, a first brush being connected through line 30 to ground, and the second brush being connected through line 32 to a field current control circuit generally designated 34. The field current control circuit comprises an operational amplifier 36, which can be for example, one of the four independent dual-input amplifiers in the LM3900 quad amplifier available from Nation Semiconductor Incorporated, 2900 Semiconductor Drive, Santa Clara, Calif. The "+" input of amplifier 36 is connected through resistor 38 to interconnection terminal 2 which is connected to receive, from a speed-sensing circuit, a signal, the amplitude of which varies as a function of generator speed. The "−" input of ampifier 36 is connected to receive a sample of the voltage across the field winding, there being a connection from the field winding, through line 32 and through voltage dropping resistors 40 and 42 to ground, and from the junction of resistors 40 and 42, through resistors 44 and 46, to the "−" input of amplifier 36. Diode 48, connected between line 32 and ground, protects amplifier 36 from back e.m.f. induced in the field winding. Capacitor 50, also connected between line 32 and ground, filters out the ripple voltage which would otherwise appear across the field winding as a result of operation of the alternator, so that the ripple voltage does not interfere with precise control of field current.

The output of amplifier 36 is connected through resistor 52 to the base of NPN transistor 54. The collector of transistor 54 is connected through the resistor 56 to a positive voltage supply terminal 55, labeled $V_B$. (Terminals labeled $V_B$ are connected to the positive terminal of storage batter 24). The collector of transistor 54 is also connected through resistor 58 to the base of PNP transistor 60. The collector of transistor 60 is connected to the base of NPN transistor 62. The emitter of transistor 60 and the collector of transistor 62 are connected together to terminal 55. The emitter of transistor 62 is connected to line 32, and a protective diode 64 is connected between the emitter and collector of transistor 62.

When the voltage of the signal at interconnection terminal 2 is zero, the output of amplifier 36 is low, and transistor 54 is cut off so that the battery voltage at terminal 55 is applied to the base of transistor 60. When the base of transistor 60 is thus held positive, there is no current at the base of transistor 62, and transistor 62 is thus cut off, preventing current from entering the field winding of the generator. When a positive signal appears at interconnection terminal 2, however, the output of amplifier 36 goes positive, and causes transistor 54 to conduct. The base of transistor 60 is brought to ground potential, and transistor 62 conducts, applying current to the generator field winding.

The description thus far does not take into account the negative feedback path provided by resistors 40, 42, 44 and 46. This negative feedback path, in cooperation with the gain of the amplification circuitry causes the voltage across the field to follow the voltage of the signal at interconnection terminal 2. The voltage ratio of this circuit is determined primarily by the attenuation in the feedback path since resistors 38 and 46 are equal and the amplifier has a high gain. The values of dropping resistors 40 and 42 in the feedback path are preferably chosen so that the voltage at the "−" terminal of amplifier 36 is one-third the voltage across the field winding of the generator. Because of this ratio in the feedback path, under equilibrium conditions the voltage across the field winding is approximately three times the voltage at the terminal 2. The amplification circuit allows for precise control of generator field current from a very low power signal applied to terminal 2. This amplification circuit, because of its feedback loop, also provides for a controlled field current which is substantially independent of variations in battery voltage.

The field current control circuit of FIG. 1 also includes a voltage regulator circuit for setting the maximum voltage at the output of the alternator. The main purpose of the voltage regulator is to prevent overcharging of the storage battery.

The voltage regulator circuit is constructed as follows. A pair of resistors 66 and 68 are connected in series between ground and terminal 70, which is connected to the positive side of the storage battery, and accordingly labeled $V_B$. Preferably, the resistance of register 66 is approximately 3 time the resistance of resistor 68, so that the voltage appearing across resistor 68 is about one-fourth of the battery voltage. This voltage, appearing at the junction between resistors 66 and 68 is applied to the "−" input of amplifier 72 through resistor 74. Amplifier 72 is another operational amplifier, similar to amplifier 36. Signals applied to its "+" and "−" inputs have opposite effects on its output. A smoothing capacitor 76, e.g. 10 microfarads, is connected across resistor 68 to prevent any switching of the voltage regulator which might be caused by a ripple voltage at the alternator output. Terminal 78 is connected to the positive side of a separate five volt supply. A voltage dropping network is provided by the series combination of variable resistor 80 and fixed resistor 82, connected between terminal 78 and ground. The wiper of resistor 80 is connected through resistor 84 to the "+" input terminal of amplifier 72. The values of resistor 80 and 82 are preferably so chosen that the voltage, measured between the wiper of resistor 80 and ground can be varied from a minimum of 3.5 volts to a maximum of 5 volts. The output of amplifier 72 is connected through resistor 86 to the base of NPN transistor 88. The emitter of transistor 88 is connected to ground, and the collector is connected through resistor 90 and diode 92 to junction 94 between resistors 44 and 46 in the feedback path of amplifier 36. Resistor 96 is connected between positive terminal 70 and the junction between resistor 90 and diode 92. In normal operation, transistor 88 is conductive, and the voltage at the anode of diode 92 is lower than the lowest non-zero control voltage applied to terminal 2. However, the connection through resistor 96 through positive terminal 70 provides for a high positive voltage at the anode of diode 92 when transistor 88 is cut off.

The operation of the voltage regulator circuit involves a comparison of the alternator output voltage (at terminal 70) with a reference voltage established by the setting of variable resistor 80. The comparison is accomplished by amplifier 72. Assuming, for the sake of illustration, that resistors 66 and 68 are chosen to produce a voltage drop to one -fourth the voltage at terminal 70, when the voltage at terminal 70 is below a value which is four times the voltage at the wiper of resistor 80, the output of amplifier 72 is high, and transistor 88 is conductive. Under these conditions, the voltage at the anode of diode 92 is low (typically one volt). Assuming that the voltage across the generator field is zero, the small voltage at the anode of diode 92 produces a small current at the "−" input of amplifier 36, forcing the output of amplifier 36 to a low condition. The voltage at interconnection terminal 2 will be either zero or very slightly positive under these circumstances.

The speed sensing circuits (the details of which are yet to be described) produce discontinuous stepwise variations in the voltage amplitude at interconnection terminal 2, and the lowest non-zero value is typically about 2 volts. With a non-zero voltage at terminal 2, the output of amplifier 36 goes high, and current is applied to the generator field. The voltage across the field produces a positive voltage at junction 94 which reverse-biases diode 92, so that the voltage at the anode of diode 92 has no effect on the field current.

If the voltage at the output of the alternator exceeds the value which is preset by the adjustment of resistor 80 (i.e. the voltage at terminal 70 is more than four times the voltage at the wiper of resistor 80), then the output of amplifier 72 switches to a low condition, transistor 88 is cut off, and the battery voltage at terminal 70 is applied to the anode of diode 92. This overrides the normal operation of the field current control, by applying a high positive voltage to the "−" input of amplifier 36. When this occurs, no field current is applied, regardless of the signal level at interconnection terminal 2.

A resistor 98 is connected between the output of amplifier 72, and its "+" input. Resistor 98 provides a small amount of positive feedback to prevent the output of amplifier 72 from switching rapidly between its high and its low position when the voltage at terminal 70 hovers about the critical value. The effect of resistor 98 is to increase the difference between the amplitudes of the "−" and "+" inputs as the generator output voltage rises above the reference level. Resistor 84 assists resistor 98 in accomplishing this objective, in that it permits the "+" input of amplifier 72 to be modified more easily by current in resistor 98. Resistors 84 and 74 are preferably equal so that the regulation range is determined only by resistors 66, 68, 80 and 82.

With resistors 80 and 82 chosen to provide for a variation in the voltage at the wiper of resistor 80 from 3.5 to 5 volts, and with resistors 66 and 68 chosen to produce a voltage drop ratio of four, the voltage regulator can be set to limit the generator output voltage to any chosen value from 14 to 20 volts. The range of the voltage regulator can be easily modified by changing the values of these resistances. The range of 14 to 20 volts is desirable in wind-driven power plant systems, where a 12 volt storage battery is located at a distance from the generator. The limits of 14 to 20 volts allow for losses in the cable connecting the generator to the storage battery.

The general function of the circuit in FIG. 2 is to sense the rotational speed of the generator and to provide a signal for delivery to the control circuit of FIG. 1, which signal has an amplitude varying as a function of generator speed. In the circuit of FIG. 2, generator speed is sensed by counting pulses derived from the generator armature. To this end, a connection is made, through interconnection terminal 1, between winding 16 of the generator armature (FIG. 1) and the base of an NPN transistor 100. Transistor 100 is interconnected with another NPN transistor 102 in a Darlington configuration. The collectors of both transistors are connected through terminal 104 to the positive side of the storage battery, and the emitter of transistor 102 is connected through resistor 106 to ground. An output is taken from the emitter of transistor 102, so that the Darlington configuration acts as a buffer, having a high input impedance and a gain of unity.

The signal applied by the generator armature to the base of transistor 100 is an alternating voltage superimposed on a positive d.c. level, the latter resulting from reverse leakage in the rectifiers which connect the armature to the storage battery. The frequency of this a.c. coltage varies with rotational speed of the generator, and the a.c. voltage is present even when the field is not energized, as a result of residual magetization in the core of the field winding.

The emitter of transistor 102 is connected through resistor 108 and capacitor 110 to ground. The resistor and capacitor together constitute a low-pass filter for eliminating radio-frequency interference. The output of the filter is taken from the ungrounded side of capacitor 110. Diode 112 limits the negative excursion of the filter output to −0.07 volts, and prevents high negative voltages which occur when the field is energized, from causing damage to amplification circuitry receiving the output of the low-pass filter. The output of the filter is coupled through capacitor 114 and resistor 116 to the "−" input of operational amplifier 118, which is similar to amplifiers 36 and 72. The "+" input of amplifier 118 is grounded, and a resistor 120 is connected between the output of the amplifier and its "−" input. Another resistor 122 is connected between the output and ground. The function of resistor 120 is to provide negative feedback, controlling the gain of the amplification circuitry. Thus, the voltage gain from the emitter of transistor 102 to the output of amplifier 118 is determined by the values of resistors 120, 116 and 108. Typically, resistor 120 has a resistance value about 200 times the sum of the values of resistors 116 and 108, so that the voltage gain is approximately 200. This results in saturation of amplifier 118 at voltage peaks, producing rectangular pulses at output line 124. Resistor 122 is provided in order to allow the output of amplifier 118 to reach a "zero" logic level.

The circuitry of FIG. 2 thus far described acts as a combined amplifier and pulse-shaper, and produces, at line 124, a series of pulses which are suitable for actuating the logic circuitry which will not be described. The logic circuitry repetitively establishes a predetermined time interval, repetitively counts the number of pulses in line 124 which occur in the predetermined time interval, and establishes, at interconnection terminal 2, a signal amplitude which depends upon the number of pulses counted in a given counting cycle.

Line 124, which carries the series of pulses, is connected to the trigger input T of a monostable multivibrator 126. The multivibrator is a National Semiconductor LM555 timer, with appropriate external connections for monostable operation, as shown. Thus, a timing capacitor 128 is connected between a "threshold" terminal and ground. Resistors 130 and 132, the latter being adjustable, are connected between the positive 5 volt supply at terminal 134, and the ungrounded side of capacitor 28 for charging the capacitor to establish the timing interval. Output terminal U is connected tO deliver a positive-going timing pulse to line 136. The leading edge of the positive-going timing pulse occurs when the trigger input at T switches from a high to a low condition.

Line 124 is also connected to one of the inputs of a two-input NAND gate 138, the other input of which is connected to line 136 to recieve the output of timing multivibrator 126. The output of NAND gate 138 is connected through line 140 to one of the inputs of a second two-input NAND gate 142. The output of NAND gate 142 is connected through line 144 to input terminal I of counter 146. Counter 146 is a four-bit binary counter having outputs A, B, C and D, providing divisions by 2, 4, 8 and 16 respectively. Counter 146 has a pair of reset terminals R, both of which are connected to an internal gate. An input terminal E is connected to the input of the second flip-flop in the counter, and an external connection must be made through line 148 between terminals E and A in order to connect the output of the first flip-flop in the counter to the input of the second flip-flop.

The outputs of the counter at terminals B and D are connected to the inputs of two-input NAND gate 150, the output of which is connected through line 152 to the remaining input of NAND gate 142. The purpose of gate 150 is to prevent the counter from counting beyond a count of fifteen in which event its output would correspond to a count of zero and cause faulty control. Since the maximum usable count in the system is a count of ten, it is possible to utilize terminals B and D to limit the count, since they both go "high" at a count of 10. when this occurs, the output of gate 150 disables gate 142, and pevents further pulses from being counted.

Line 136, which is connected to output terminal U of multivibrator 126, is connected through capacitor 154 to the reset terminals R of counter 146. Resistor 156 is connected between reset terminals R and ground to keep the reset terminals normally at ground potential to allow counting to take place. Diode 158, connected across resistor 156 prevents the reset terminals from going negative at the end of a timing pulse and causing damage to the counter.

The binary-coded output from terminals A, B, C and D of counter 146 is connected through lines 158, 160, 162 and 164, to the inputs of a four-bit latch 166. The latch is a National Semiconductor DM7495 four-bit parallel-in parallel-out shift register. The shift register has a pair of clock inputs, one of which, J, is connected to the output of multivibrator 126 through line 136. (The other clock input is disabled.) The shift register is designed so that data transfer takes place on the negative transition of the clock pulse. When the clock input at J switches from a high to a low condition, the latch retains the binary-coded information from counter 146 until the J input again switches from a high to a low condition. The output of latch 166 is delivered to lines 168, 170, 172 and 174 to a binary-to-decimal decoder 176. Decoder 176 is a National Semiconductor DM74145 BCD-to-decimal decoder/driver, which translates a four-bit binary input to a decimal output. As shown, there are ten outputs, three of which are connected to line 178 directly through lines 180, 182 and 184. The remaining outputs of decoder 176 are connected to line 178 through resistors 186-198. These resistors have resistance values selected in accordance with the desired functional relaionship between generator speed and signal amplitude at interconnection terminal 2.

Decoder 176 functions in such a way that all of the outputs are open-circuited except for the single output corresponding to the decimal equivalent of the binary input, the latter being connected to ground. The outputs of the decoder may be thought of as numbered from "zero" to "nine," with line 184 being connected to the "zero" output, line 182 being connected to the "one" output, and so on. The decoder grounds line 184 when the output of the latch corresponds to a binary "zero". It grounds line 182 when the output of the latch corresponds to a binary "one," and so on. At a count of nine, the decoder output connected to resistor 198 is grounded. When a count of ten or more is present at the inputs, all of the outputs are open-circuited.

Line 178 is connected to a 5 volt supply terminal 200 through variable resistor 202 and fixed resistor 204. Line 178 carries a variable voltage depending on the condition of decoder 176. A connection is made from line 178, through resistor 206, to interconnection terminal 2. A capacitor 208 is connected between terminal 2 and ground. The combination of resistor 206 and capacitor 208 acts as an averaging circuit to prevent the decoder from causing mechanical stresses in the rotor-generator system by imposing instantaneous changes in loading.

In the operation of the circuit of FIG. 2, as the generator rotor rotates, the alternating current signal at interconnection terminal 10 is translated into a train of positive-going pulses at line 124. The repetition rate of these pulses is directly proportional to generator speed.

Initially the output of monostable multivibrator 136 is in a low condition. As a consequence, the output of gate 138, at line 140, is high. At the end of a first pulse appearing at line 124, the logical condition of line 124 switches from "high" to "low". This triggers multivibrator 126 through its trigger terminal T, and the output at terminal U switches to a high condition for an interval of time predetermined by the adjustment of resistor 132. The interval typically is 0.0225 seconds.

The output of multivibrator 126 at terminal U does three things. First, when the output of multivibrator 126 is in a high condition, it enables gate 138, permitting delivery of pulses to the counting circuitry. Secondly, the leading edge of the output pulse at terminal U, when applied to capacitor 154, produces a short, positive-going reset pulse which is applied to reset terminals R of counter 146 to reset the count of the counter to zero. Finally the transition of the multivibrator output from a high to a low condition causes latch 166 to retain the count in the counter until the next time a similar transition takes place. This mode of operation, provides for updating of the information retained in the latch before it becomes obsolete as a result of changing rotor speed.

Thus, a first pulse in line 124 triggers monostable multivibrator 126, and counter 146 is reset. Since the output of multivibrator 136 enables gate 138, subsequent pulses in line 124 produce corresponding pulses in line 140. Assuming that line 150 is in a high condition, gate 142 is also enabled, and corresponding pulses are delivered to the counter input terminal I. Since there are two logic reversals by reason of the two NAND gates, the pulses at the counter input are positive-going and correspond to the pulses in line 124.

The counter stops counting pulses when the output of multivibrator 126 goes "low" disabling gate 138. At the same time, the transition from "high" to "low" at terminal J of latch 166 causes a data transfer to take place within the latch, and output lines 168-174, which had been selectively energized in accordance with the last preceding count, are energized in accordance with the present count in the counter, and remain so energized until the end of the next output pulse from monostable multivibrator 126. Accordingly updating of the information retained in the latch takes place instantaneously. This is important for effective control of the signal at interconnection terminal 2.

The binary-to-decimal decoder 176 translates the output of the latch to decimal form. For counts from zero to two, line 178 is grounded, and the voltage at interconnection terminal 2 is zero. For counts between three and nine, the voltage at terminal 2 is determined by the values of resistors 186-198. At a count of ten, line 178 is open-circuited, and a maximum voltage is applied to terminal 2.

Figure 5:
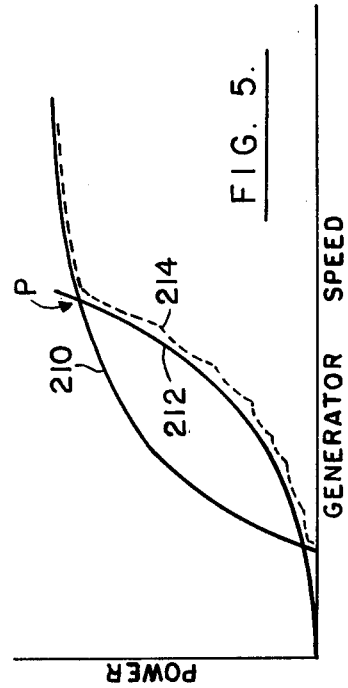
FIG. 5 is a rectangular plot showing a typical relationship between the available wind power curve for a given mechanical system and a typical generator load curve. This plot illustrates how the generator load curve is modified by the speed sensing and field current control circuitry of the invention.
Figure 6:
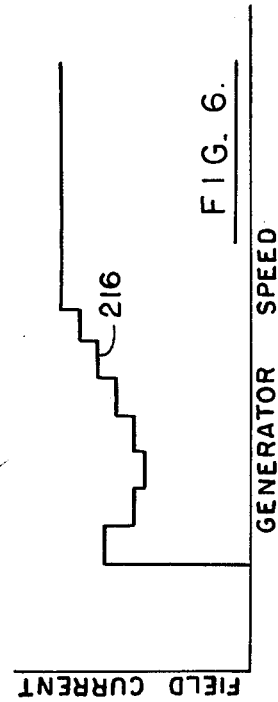
FIG. 6 is a rectangular plot which illustrates how the system in accordance with the invention causes field current to vary with generator speed in a stepwise manner.

FIGS. 5 and 6 illustrate the operation of the combined speed sensing circuitry and control circuitry shown in FIGS. 1 and 2. In FIG. 5, curve 210 is a typical characteristic generator load curve under saturated field conditions. For consistency with the other curves, curve 210 depicts mechanical input power to the generator rather than electrical output power. The mechanical input power corresponds to electrical output power divided by generator efficiency. The mechanical input power depicted by curve 210 corresponds to the maximum possible electrical output power from the generator for any given generator speed.

Curve 212 is a typical curve depicting available wind power for a given mechanical system. This curve can be interpreted as meaning simply that, in a given mechanical system, for a given amount of available wind power corresponding to the ordinate of a point on the curve, the generator speed will not exceed the value of the abscissa of that point.

It is characteristic of most generators that the curve corresponding to curve 210 is concave downwardly. Similarly, it is characteristic of most wind-driven rotors, that the curve corresponding to curve 212 is concave upwardly. In a system in which these curves retain their original shapes, curve 210 can be moved to the right by using a smaller generator, or curve 212 can be moved to the left by using a larger rotor. However, if the relationship between the curves is thus modified so that they do not cross each other, then the system exhibits its maximum efficiency only at the speed where the curves most closely approach each other, and is rather inefficient elsewhere.

On the other hand, if the curves cross each other as shown, there exists a range of generator speeds for which the mechanical load imposed by the generator on the wind-driven rotor exceeds the available wind power acting on the rotor. The speed of the generator cannot exceed the speed at the low end of this range, since there is not enough wind power to cause the generator speed to increase.

In order to alleviate this problem, the circuitry of FIGS. 1 and 2 modifies the generator characteristic so that, instead of following curve 210, it follows curve 214, which is shown by a broken line. The object of the circuitry of FIGS. 1 and 2 is to cause curve 214 to match curve 212 throughout the range in which generating loading exceeds available wind power. Above the upper end of this range, the circuit causes full field excitation to be applied, and curve 214 follows curve 210.

FIG. 6 shows, by curve 216, how field current in the generator (current in line 32) varies with generating speed in a typical system. At the low end of the speed range, field current is held at zero. This is desirable, since, at low speeds, a generator will not produce a usable output, yet the field winding draws current. With current in the field cut off, drain on the storage battery is reduced. At a particular speed near the low end of the range, field current suddenly increases from zero to a relatively high value. As generator speed is further increased, field current decreases in a stepwise manner, and then increases until it reaches a point at which it levels off at a maximum value. The speed at which field current begins to decrease with increasing generator speed corresponds closely to the low end of the speed range in FIG. 5 in which curve 210 is above curve 212. The point at which field current levels off at its maximum value corresponds closely to the upper end of this range.

The variations in generator field current depicted in FIG. 6 result in a modified generator characteristic curve 214, which, as shown, closely follows curve 212 in the range in which curve 212 is below curve 210, and closely follows curve 210 above this range.

The speed sensing circuitry of FIG. 2 is calibrated in the following manner. First, the abscissa is found for the point P in FIG. 5 at which wind power begins to exceed the mechanical load posed by the generator. At this point, full field voltage should be applied. Consequently, the timing of monostable multivibrator 126 (FIG. 2) is adjusted so that the duration of its output pulse is equal to the time required for ten pulses to enter the counter at a generating speed corresponding to point P. Thus, for example, if point P corresponds to a speed 3800 r.p.m., and the generator is a 7 pole generator producing 7 cycles per revolution, the pulse rate in line 124 (FIG. 2) will be 443 pulses per second. At this rate, the time duration required for ten pulses to be counted is 0.0225 seconds. Monostable multivibrator 126 is adjusted accordingly by adjustment of resistor 132.

Next, a determination is made of the "cut-in" speed, that is the minimum speed at which field current is applied. In general, the cut-in speed will be chosen to be near the lowest speed at which the generator will produce an output. Once the cut-in speed is determined, appropriate outputs of decoder 176 (FIG. 2) are connected directly to line 178. For example, if it is determined that the generator cannot provide an output until its speed exceeds 1100 r.p.m., the first three outputs of decoder 176 are connected directly to line 178 through lines 180, 182 and 184. This means that the cut-in speed will correspond to a decimal count of three, which is equivalent to 1140 r.p.m. Consequently, below 1140 r.p.m., the voltage applied to interconnection terminal 2 is zero, and the field current is accordingly zero. This reduces drain on the battery. At 1140 r.p.m., however, that is at a count of three pulses, decoder 176 connects resistor 186 to ground, and the voltage at interconnection terminal 2 is determined by the voltage dropping network comprising resistors 202, 204 and 186.

The values of resistor 186-198 are then carefully chosen to produce a stepwise variation in field current which will result in as close as possible a match between curve 214 and wind power curve 212. This can be accomplished by initially using variable resistors for resistors 186-198, adjusting their values for a precise match of the curves, and thereafter substituting fixed resistors.

The basic shapes of curves 210 and 212, corresponding respectively to the generator and wind-driven rotor units, are similar for similar units, and, accordingly, resistors 186-198 do not have to be changed from one unit to the next. However, such differences as do occur between units can be compensated for by adjustment of the timing of monostable multivibrator 126 through adjustment of resistor 132, and by adjustment of resistor 202, which determines the voltage at interconnection terminal 2. Differences in the power output capability of wind-driven rotors can be accommodated by adjustment of resistor 132. Differences in the generator outputs can be accommodated by adjustment of resistor 202. Once the values of resistors 186-198 are appropriately chosen, precise matching of the wind-driven rotor and the generator is dependent only on these two controls. Together, these two controls provide considerable flexibility in the adjustment of the position and shape of curve 216 which in turn determines position and shape of the power response curve 214.

From the foregoing, it will be seen that the circuit of FIGS. 1 and 2 possesses a number of advantages: in particular, the ability to achieve optimum efficiency in operation by obtaining a precise matching of the wind power and generator load curves.

Turning now to FIG. 3, an alternative speed sensing circuit is shown, utilizing a magnetic pick-up 218 located closely adjacent the blades of the cooling fan 220 of the generator. Magnetic pick-up 218 is one of a number of commonly available permanent magnet proximity transducers, such as model VR-375-1250 ST available from Transducer Systems, Inc., 710 Davisville Road, Willow Grove, Penna. The nominal output for this particular unit is a two volt peak across a 10,000 ohm load.

The blades of the generator cooling fan are not symmetrically spaced from each other. The purpose of the non-symmetrical spacing is to prevent the production of sirenlike noise when the cooling fan rotates. Unfortunately, the non-symmetrical spacing of the blades causes the series of pulses generated by a pick-up device cooperating with the blades to be uneven. If an attempt were made to use such a series of uneven pulses to drive the circuit of FIG. 2, erratic results would be obtained, preventing a good match between the wind power curve and the modified generator load curve. The circuit of FIG. 3 is similar to the circuit of FIG. 2, in that it repetitively establishes a predetermined time interval, and repetitively counts the number of pulses occurring in said interval, establishing a signal amplitude dependent on the count. However, in order to avoid the effect of the unevenness in the pulse train generated by the magnetic pick-up, an additional counter is provided, together with associated logic circuitry, and the time interval established by the monostable multivibrator is lengthened. The additional counter produces an even train of pulses, the repetition rate of the pulses being proportional to rotational speed of the generator.

The amplification and pulse-shaping circuitry receiving the output of the pick-up through line 222 is similar to the corresponding circuitry in FIG. 2. It comprises a Darlington circuit 224, filtering means 226, a clamping diode 228, and an operational amplifier 230, delivering an output to line 232.

The additional counter which produces an even pulse train comprises counter 234, which is a four-bit binary counter similar to counter 146 of FIG. 2. Line 232 is connected to input terminal I of counter 234. The divide-by-sixteen output at terminal D and the divide-by-four output at terminal B are both connected to the inputs of a two-input NAND gate 236. The output of gate 236 is connected to one of the inputs of a second two-input NAND gate 238, the output of which is connected to both reset terminals R of counter 234.

The pulses in line 232 are delivered to the trigger input T of monostable multivibrator 240, which corresponds to multivibrator 126 of FIG. 2 except that it produces a longer output pulse at its output terminal U. The output at terminal U is connected through line 242 to the remaining input of two-input NAND gate 238. The output at terminal U is also coupled to reset terminals R of counter 244, which corresponds to counter 146 of FIG. 2. Also, the output of multivibrator 240 is connected through line 246 to the clock terminal J of latch 248 to effect data transfer in the latch at the trailing edge of the output pulse from multivibrator output terminal U.

Counter 244 is driven in accordance with the pulses delivered by the D output of counter 234. The D output of counter 234 is connected through line 250 to an input of two-input NAND gate 252, the output of which is connected to input terminal I of counter 234. The other input of gate 252 is connected to the output of a two-input NAND gate 254, which derives its inputs from output terminals B and D of counter 234. The purpose of gate 254 is similar to that of gate 150 in FIG. 2, namely to stop counter 244 at a count of ten.

The four outputs at terminals A, B, C and D of counter 244 are connected to the inputs of latch 248, and the outputs of latch 248 are delivered to decoder 256, which is connected to an interconnection terminal 2 in the same manner as decoder 176 of FIG. 2. The circuit of FIG. 3 is used in conjunction with the control circuitry of FIG. 1, there being a connection between the two circuits at interconnection terminal 2. Since generator speed is sensed by a different means, interconnection terminal 1 in FIG. 1 is not used.

In general, the operation of the circuit of FIG. 3 is similar to that of the circuit of FIG. 2, the principal difference being that counter 244 operates on the output of counter 234 rather than directly on the output of the amplification and pulse-shaping circuitry. At the end of a first pulse in line 232, the output of multivibrator 240 at terminal U goes "high". At this time the count in counter 234 is zero, and the ouput of gate 236 is also "high". With two "highs" at its input, the output of gate 238 is "low", and counter 234 is enabled. Subsequent pulses are counted until a count of ten is reached, whereupon output terminals D and B of counter 234 are both in a logical "high" condition. At this point, the output of gate 236 switches to a low condition, producing a "high" at the output of gate 238, regardless of the state of the output of multivibrator 240. The "high" at the output of gate 238 resets counter 234. The counter continues to count starting again at a count of zero.

At a count of eight, the output of counter 234 at terminal D goes "high". This output returns to a low condition upon resetting of this counter. As a consequence, there is produced in line 250 a short pulse which is inverted by gate 252, and counted by counter 244. It should be noted that cooling fan 220 has eleven fins. The pulse produced by the first of these fins triggers monostable multivibrator 240, but is not counted by counter 234. The remaining ten pulses in a single rotation of the generator are counted by counter 234. As a result, for every eleven pulses in line 232, one pulse is produced in line 250 for counting by counter 244. The pulses at the output of counter 234 are evenly spaced so long as the generator is operating at a constant speed. Consequently, the uneven spacing of the blades on fan 220 does not interfere with the proper operation of the counter, latch and decoder. More specifically, since only one pulse is produced at line 250 for each complete rotation of the generator, it does not matter what position the generator shaft is in when counting by counter 244 begins.

The time interval for the high condition at output U of multivibrator 240 should be seven times that of the corresponding time interval in the circuit of FIG. 2. Resistor 258 and capacitor 260, which determine the "on" time for the multivibrator are chosen accordingly.

FIG. 4 shows another alternative circuit which can be interconnected with the circuit of FIG. 1 through interconnection terminals 1 and 2 to provide a complete system.

In the circuit of FIG. 4, pulses generated in the generator armature are delivered from interconnection terminal 1 to an amplification and pulse-shaping circuit similar to that shown in FIGS. 2 and 3. The amplification and pulse-shaping circuit comprises a Darlington amplifier 262, filtering means 264, a clamping diode 266, and an operational amplifier 268. It is of particular importance that the pulses produced by the amplification and pulse-shaping circuit be rectangular in shape, since they are delivered to a tachometer circuit 270, which will not operate properly unless the pulses at its input are rectangular. Accordingly, the gain of the amplification and pulse-shaping circuitry is set so that even the smallest pulses appearing at interconnection terminal 1 cause saturation in amplifier 268.

The output of amplifier 268 is coupled through resistor 272 and capacitor 274 to tachometer circuit 270. The tachometer is preferably a so-called "frequency doubling" tachometer, although other well-known tachometer circuits can be used. Frequency doubling is desirable as it reduces ripple in the d.c. output of the tachometer and simplifies filtering at the tachometer output.

The tachometer circuit comprises an operation amplifier, which is desirably one unit in an LM3900quad amplifier. (Amplifier 268 can be another unit in the same quad.) Capacitor 274 is connected to the "+" input, and capacitor 276 is connected between the output and the "−" input. Also connected between the output and "−" input is the series combination of variable resistor 278 and fixed resistor 280. Diode 282 is connected between the "−" and "+" inputs of amplifier 270, the anode of the diode being connected to the "−" input.

Tachometer 270 produces a d.c. output in line 284, the voltage level of which is proportional to the pulse rate at its input. The tachometer is calibrated by adjustment of resistor 278 so that a given pulse rate at the input can be made to correspond to a desired d.c. level at the output.

An array of 4 voltage comparators 286, 288, 290 and 292 is provided. Each of these comparators is preferably one unit of a National Semiconductor LM339 quad comparator. A string of resistors is connected between a positive supply terminal 294 and ground. These resistors 296, 298, 300, 302 and 304 constitute a voltage dividing network, providing predetermined reference voltage levels at juntions 306, 308, 310 and 312. Jucntion 306, which is at the lowest potential of the four junctions is connected through resistor 314 to the "+" input terminal of comparator 286. Junction 308, which is at the next highest potential is connected to the "+" input of comparator 288 through resistor 316. Junction 310 is connected to the "+" input of comparator 290 through resistor 318. Junction 312 is connected to the "+" input of comparator 292 through resistor 320.

The tachometer output, in line 284, is connected to the "−" input terminals of the comparators respectively through resistors 322, 324, 326 and 328. Each "−" input is connected to ground through a capacitor, capacitors being provided at 330, 332, 334 and 336. These capacitors, together with resistors 322-328 provide filtering of the tachometer output. The resistors 322-328 also provide isolation between the comparators.

The outputs of comparators 286-292 are taken from the open collectors of internal transistors, and the internal circuitry of each comparator is such that the output transistor is conductive when the voltage level at the "−" input exceeds the voltage level at the "+" input, thereby grounding the output. Otherwise, the output transistor is cut off so that the comparator output is an open circuit.

The output of comparator 286 is connected through resistors 338 and 340 to a positive supply terminal 342. Junction 344, between resistors 338 and 340, is connected through resistor 346 to interconnection terminal 2. A capacitor 348 is connected between terminal 2 and ground, and together with resistor 346, forms an averaging circuit for the output signal at terminal 2. It should be noted at this point that resistors 340 and 338 act as a voltage dropping pair, and that, when the only comparator with its output grounded is comparator 286, the voltage at interconnection terminal 2 is dependent upon the value of resistor 338.

The output of comparator 288 is connected through resistors 350 to a positive supply terminal 352. The output of comparator 288 is also connected through resistor 354 to the base of NPN transistor 356, the emitter of which is grounded, and the collector of which is connected to terminal 2. The output of comparator 288 is also connected, through resistor 358 to the base of NPN transistor 360. The emitter of transistor 360 is grounded, and its collector is connected through resistor 362 to the "−" input of comparator 288.

The output of comparator 290 is connected through resistor 364 to junction 344. Resistor 364 corresponds to resistor 338 at the output of comparator 286, and has a similar function. The output of comparator 290 is also connected to the base of PNP transistor 366. The collector of this transistor is grounded, and its emitter is connected through line 368 to the "−" input of comparator 286.

The output of comparator 292 is connected through diode 370 to the "−" input of comparator 290, and through diode 372 to the "−" input of comparator 286.

In each of comparators 286, 290 and 292 a resistor is connected between the output and the "+" input. These resistors, 374, 376 and 378 are similar in function to resistor 98 of FIG. 1; that is they provide positive feedback to prevent oscillation.

The circuit of FIG. 4 senses generator speed and applies a control signal to interconnection terminal 2, the amplitude of the control signal varying in a stepwise manner in accordance with generator speed. In the case of FIG. 4, the amplitude of the signal at terminal 2 has four possible values, depending on the voltage level at line 284.

When the generator is not turning, the outputs of all four comparators are open-circuited. With the output of comparator 288 open-circuited, the base of transistor 356 is positive by reason of its connection to the positive supply terminal 352. Accordingly, transistor 356 is conductive, and ground interconnection terminal 2, causing its voltage to be very nearly zero. It is preferred that the collector of transistor 356 be connected directly to terminal 2, rather than to junction 344 for two reasons. First, the connection directly to terminal 2 reduces the quiescent current drawn by the circuit when no power is being generated, while still allowing resistors 340, 338 and 364 to have relatively low values. It is important that these resistors have relatively low values to prevent the resistors 374 and 376 from affecting the signal level at terminal 2. Secondly, by connecting the collector of transistor 356 directly to terminal 2, the collector-emitter saturation voltage is kept at a minimum, making the voltage at terminal 2 as small as possible during quiescent conditions.

Before describing the complete operation of the circuit, it is important to note the function of transistor 360. Transistor 360, together with resistors 362 and 324 allows for precise turn-off, turn-off hysteresis when the circuit switches between the condition when the voltage at terminal 2 is zero and the condition in which the voltage at terminal 2 is positive. When transistor 360 is conductive, which is the case when the output of comparator 288 is open-circuited, the voltage at the "−" input of comparator 288 is determined by the voltage in line 284 from the tachometer, and the values of resistors 324 and 362, these resistors acting to produce a voltage drop at the "−" input of comparator 288. When this voltage exceeds the voltage at junction 308, the output of comparator 288 is grounded, and transistors 356 and 360 are both cut off. Since transistor 360 is cut off, the voltage at the "−" input of comparator 288 is the same as the voltage in line 284. This being the case, the output of comparator 288 cannot become open-circuited again until the tachometer output voltage in line 284 falls below the voltage level at juntion 308. Thus, the output of comparator 288 switches from an open condition to a grounded condition at a higher tachometer output level than the level at which it switches from a grounded to an open condition. This hysteresis allows for the fact that the blades of the wind-driven rotor will slow down when field excitation is applied. It eliminates a continual switching of the field excitation during low wind velocity conditions.

As previously stated, when the generator is not turning, the output of tachometer 270 in line 284 is approximately zero, and the outputs of all of the comparators 286, 288, 290 and 292 are open-circuited. Transistor 356, however, is conductive, and consequently the voltage level at terminal 2 is approximately equal to zero. The values of the resistors 296-304 in the dropping network are chosen so that the voltages at junctions 306, 308, 310 and 312 correspond to the voltage levels at the output of tachometer 270 for four predetermined generator speeds.

When the generator begins to speed up, and the voltage in line 284 exceeds the voltage at junction 306, the output of comparator 286 is grounded by the switching of the output transistor in the comparator. Nothing happens at terminal 2, however, until the voltage level at the output of the tachometer reaches the voltage level at the "−" input of comparator 288. When this occurs, the output of comparator 288 becomes grounded, and transistors 356 and 360 are both cut off. When transistor 356 becomes cut off, the voltage level at terminal 2 is established by the voltage dropping circuit comprising resistors 340 and 338. This condition prevails even if the generator speed drops, unless it drops to a level such that the voltage in line 284 falls below the voltage level at junction 308, whereupon the output of comparator 288 becomes open-circuited, and transistor 356 conducts, causing the voltage at terminal 2 to drop to zero.

Assuming that, instead of dropping, the generator speed increases beyond the level required to cause the output of comparator 288 to switch, the voltage in line 284 eventually reaches the level of the voltage at junction 310. At this point, the output of comparator 290 is connected to ground. This causes transistor 366 to conduct, ground the "−" input of comparator 286. The output of comparator 286 opens, and resistor 338 is no longer instrumental in determining the voltage level at terminal 2. Rather, the voltage level at terminal 2 is now determined by the dropping network comprising resistors 340 and 364. It will be noted tha the presence of isolating resistor 322 is important because it allows transistor 36 to ground the "−" input of comparator 286 without seriously affecting the tachometer output.

As generator speed further increases, the voltage in line 284 reaches the voltage level at junction 312. The output of comparator 292 becomes grounded when this occurs, and the "−" inputs of comparators 286 and 290 are simultaneously grounded by the output of comparator 292 through diodes 372 and 370 respectively. (Isolating resistors 322 and 326 are important, since they allow this to occur). With the outputs of comparators 286 and 290 both open-circuited, resistors 338 and 364 are both out of service, and the voltage at interconnection terminal 2 is approximately equal to the supply voltage at terminal 342.

Summarizing the foregoing, the circuit of FIG. 4 is capable of applying four different voltage levels to interconnection terminal 2, the first voltage being zero, the second voltage being determined by resistors 340 and 338, the third voltage being determined by resistors 340 and 364, and the fourth being the full supply voltage at terminal 342. In this circuit, it should be noted that resistors 338 and 364, which determine the two intermediate voltage levels at terminal 2, are independent of each other in that, at any one of these two intermediate levels, the voltage at terminal 2 is determined by only one of these resistors. The independence of these two voltage levels makes it easy to adjust the output function of the circuit, since the adjustment of the voltage level for one step will not affect the voltage level for another step.

The circuit of FIG. 4 can be easily modified to provide more than four voltage levels at the output terminal by the installation of additional comparators corresponding to comparator 290, together with appropriate logic (corresponding to transistor 366 and diodes 370 and 372) to insure that the voltage levels for individual steps are independently determined.

While three specific embodiments of the invention have been described, it will be apparent that many modifications can be made to produce other specific embodiments. For example, the tachometer and comparator array of FIG. 4 can be used in conjunction with the magnetic pick-up of FIG. 3. Preferably, such a combination would take advantage of the prescaling counter 234. Any one of the circuits of FIGS. 2, 3 and 4 can be modified to provide a greater number (or a lesser number) of field current steps. It will also be apparent that, in any of the circuits described herein, various alternatives to the components specifically disclosed can be used, and that numerous other modifications can be made without departing from the scope of the invention as defined by the following claims.

We claim:

1. In a wind-driven electric power plant comprising a wind-responsive rotor and a rotating electric generator connected to be driven thereby, said generator having an electrically energizable field winding, apparatus for controlling the loading of said generator comprising:
    means for sensing the rotational speed of said generator and providing a signal the amplitude of which varies as a function of said rotational speed; and
    control means, responsive to said signal, for controlling the current in said field winding in accordance with the rotational speed of said generator whereby the load imposed by the generator closely follows but does not substantially exceed the available power from said rotor through a wide range of rotational speeds;
    wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;
    wherein said control means comprises amplification means connected to receive said signal as an input, and having its output connected to deliver said current to said field winding; and
    in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means.

2. In a wind-driven electric power plant comprising a wind-responsive rotor and rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the laod imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed; monostable multivibrator means connected to be triggered by pulses in said series, and producing an output pulse of predetermined duration in response to a triggering pulse; counting means for counting pulses; gating means connected to receive pulses in said series and to receive the output pulse of said multivibrator means, said gating means being connected to deliver a pulse to said counting means for each pulse in said series only during the duration of the output pulse of said multivibrator means; means, responsive to the leading edges of the output pulses of said multivibrator means, for resetting said counter; latch means connected to receive the output of said counter for temporarily retaining the same; means for instantaneously updating the information retained by said latch means in response to the trailing edges of the output pulses of said multivibrator means; and means connected to receive an output from said latch means and to establish the amplitude of said signal in accordance with the information retained by said latch means.

3. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said generator includes a cooling fan having non-symmetrically spaced blades, and in which said means for sensing the rotational speed of said generator comprises: magnetic pick-up means located adjacent the path of travel of the blades of said fan for providing a first series of pulses, the pulses of said first series occurring each time a blade passes said pick-up means; first counting means for receiving said first series of pulses and providing a second series of pulses, the pulses of said second series occurring each time a predetermined number of pulses in said first series is received by said first counting means whereby the repetition rate of the pulses in said second series is proportional to the rotational speed of said generator; means for repetitively establishing a predetermined time interval; second counting means for repetitively counting the number of pulses in said second series occurring in said predetermined time interval, and means for establishing said predetermined amplitude for said signal in dependence on the count in said second counting means.

4. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsvie to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said generator is an alternator having an armature and means connected to said armature and adapted to deliver current for use, and in which said means for sensing the rotational speed of said generator comprises amplification means connected to said armature for amplifying alternating signals produced in said armature, and is responsive to the frequency of said alternating signals to establish the amplitudes of the signal delivered to said control means.

5. In a wind-driven electric power plant comprising a wind-responsive rotor and a rotating electric generator connected to be driven thereby, said generator having an electrically energizable field winding, apparatus for controlling the loading of said generator comprising:
means for sensing the rotational speed of said generator and providing a signal the amplitude of which varies as a function of said rotational speed; and
control means, responsive to said signal, for controlling the current in said field winding in accordance with the rotational speed of said generator whereby the load imposed by the generator closely follows but does not substantially exceed the available power from said rotor through a wide range of rotational speeds;
wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;
wherein said control means comprises amplification means connected to receive said signal as an input, and having its output connected to deliver said current to said field winding; and
in which said sensing and signal-providing means is responsive to the rotational speed of the generator throughout said wide range of rotational speeds and establishes, for the lowest of said speed ranges, an amplitude for said signal which causes said control means to deliver a substantially zero current to said field winding; and in which said generator is an alternator having an armature and means connected to said armature and adapted to deliver current for use; and in which said means for sensing the rotational speed of said generator comprises amplification means connected to said armature for amplifying alternating signals produced in said armature, and is responsive to the frequency of said alternating signals to establish the amplitudes of the signal delivered to said control means.

6. In a wind-driven electric power plant comprising a wind-responsive rotor and a rotating electric generator connected to be driven thereby, said generator having an electrically energizable field winding, apparatus for controlling the loading of said generator comprising:
means for sensing the rotational speed of said generator and providing a signal the amplitude of which varies as a function of said rotational speed; and
control means, responsive to said signal, for controlling the current in said field winding in accordance with the rotational speed of said generator whereby the load imposed by the generator closely follows but does not substantially exceed the available power from said rotor through a wide range of rotational speeds;
wherein said sensing and signal-providing means comprises means for extablishing at least four speed ranges, said speed ranges together consituting said wide range of rotational speeds, and means for establishing for each of said speed ranges a predetermined amplitude for said signal, said amplitudes being different for adjacent ranges;
wherein said control means comprises amplification means connected to receive said signal as an input, and having its output connected to deliver said current to said field winding; and
in which said means for sensing the rotational speed of said generator comprises: tachometer means connected to said generator and providing an output in the form of a direct current signal the amplitude of which is a function of said rotational speed; means for establishing a plurality of different reference amplitudes, and comparator means, connected to receive said direct current signal, for comparing the amplitude of said direct current signal to said reference amplitudes; and means responsive to the output of said comparator means for controlling the amplitude of the signal delivered to said control means in accordance with the relationship of the amplitude of said direct current signal to said reference amplitudes.

7. In a wind-driven electric power plant comprising a wind-responsive rotor and a rotating electric generator connected to be driven thereby, said generator having an electrically energizable field winding, apparatus for controlling the loading of said generator comprising:
means for sensing the rotational speed of said generator and providing a signal the amplitude of which varies as a function of said rotational speed; and
control means, responsive to said signal, for controlling the current in said field winding in accordance with the rotational speed of said generator whereby the load imposed by the generator closely follows but does not substantially exceed the available power from said rotor through a wide range of rotational speeds;
wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;
wherein said control means comprises amplification means connected to receive said signal as an input, and having its output connected to deliver said current to said field winding; and
in which said means for sensing the rotational speed of said generator comprises: tachometer means connected to said generator and providing an outpt in the form of a direct current signal the amplitude of which is a function of said rotational speed; a plurality of comparators, each having a reference input, a signal input, an output and means for connecting said output to a ground when the amplitude at the signal input exceeds the amplitude at the reference input; means for establishing a different reference amplitude at the reference input of each comparator; means for coupling the output of said tachometer means to the signal inputs of said comparators whereby each of said comparators compares its signal input with a different reference amplitude; a first resistor connected between a junction and a source of electrical current, the other side of said source being connected to said ground, a second resistor connected between said junction and the output of a first one of said comparators; means for coupling said junction to the input of said control means; means controlled by the output of a second one of said comparators for connecting the input of said control means to said ground when the amplitude of the reference input to said second comparator exceeds the amplitude at its signal input; a third resistor connected between said junction and the output of a third one of said comparators; and means controlled by the output of said third comparator for causing the output of said first comparator to be disconnected from ground when the output of said third comparator is grounded.

8. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent range;

wherein said control means comprises amplification means connected to receive said signal as an input, and having its output connected to deliver said current to said field winding; and in which said means for sensing the rotational speed of said generator comprises: tachometer means connected to said generator and providing an output in the form of a direct current signal the amplitude of which is a function of said rotational speed; a plurality of comparators, each having a reference input, a signal input, an output and means for connecting said output to a ground when the amplitude at the signal input exceeds the amplitude at the reference input; means for establishing a different reference amplitude at the reference input of each comparator; means for coupling the output of said tachometer means to the signal inputs of said comparators whereby each of said comparators compares its signal input with a different reference amplitude; a first resistor connected between a junction and a source of electrical current, the other side of said source being connected to said ground, a second resistor connected between said junction and the output of a first one of said comparators; means for coupling said junction to the input of said control means; means controlled by the output of a second one of said comparators for connecting the input of said control means to said ground when the amplitude of the reference input to said second comparator exceeds the amplitude at its signal input; a third resistor connected between said junction and the output of a third one of said comparators; means controlled by the output of said third comparator for causing the output of said first comparator to be disconnected from ground when the output of said third comparator is grounded; and means controlled by the output of a fourth comparator for disconnecting the outputs of said first and third comparators from ground when the output of said fourth comparator is grounded.

9. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises: tachometer means connected to said generator and providing an output in the form of a direct current signal the amplitude of which increases with increasing rotational speed; a plurality of comparators, each having a reference input, a signal input, an output and means for connecting said output to a ground when the amplitude at the signal input exceeds the amplitude at the reference input; means for establishing respectively higher reference amplitudes at the reference inputs of first, second, third, and fourth comparators in said plurality of comparators; means for coupling the output of said tachometer means to the signal inputs of said comparators whereby each of said comparators compares its signal input with a different reference amplitude; a first resistor connected between a junction and a source of electrical current, the other side of said source being connected to said ground, a second resistor connected between said junction and the output of said first comparator; means for coupling said junction to the input of said control means; means controlled by the output of said second comparator for connecting the input of said control means to said ground when the amplitude of the reference input to said second comparator exceeds the amplitude at its signal input; a third resistor connected between said junction and the output of said third comparator; means controlled by the output of said third comparator for causing the output of said first comparator to be disconnected from ground when the output of said third comparator is grounded; and means controlled by the output of said fourth comparator for disconnecting the outputs of said first and third comparators from ground when the output of said fourth comparator is grounded.

10. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises: tachometer means connected to said generator and providing an output in the form of a direct current signal the amplitude of which increases with increasing rotational speed; a plurality of comparators, each having a reference input, a signal input, an output and means for connecting said output to a ground when the amplitude at the signal input exceeds the amplitude at the reference input; means for establishing respectively higher reference amplitudes at the reference inputs of first, second, third and fourth comparators in said plurality of comparators; means for coupling the output of said tachometer means to the signal inputs of said comparators whereby each of said comparators compares its signal input with a different reference amplitude; a first resistor connected between a junction and a source of electrical current, the other side of said source being connected to said ground, a second resistor connected between said junction andd the output of said first comparator; means for coupling said junction to the input of said control means; means controlled by the output of said second comparator for connecting the input of said control means to said ground when the amplitude of the reference input to said second comparator exceeds the amplitude at its signal input; means controlled by the output of said second comparator for increasing the difference between the amplitudes at its reference and signal inputs when the amplitude at the signal input rises above the reference amplitude at its reference input; a third resistor connected between said junction and the output of said third comparator; means controlled by the output of said third comparator for causing the output of said first comparator to be disconnected from ground when the output of said third comparator is grounded; and means controlled by the output of said fourth comparator for disconnecting the outputs of said first and third comparators from ground when the output of said fourth comparator is grounded.

11. Apparatus according to claim 10 in which said means controlled by the output of said second comparator increases the signal amplitude at its signal input when the amplitude at the signal input rises above the reference amplitude at its reference input.

12. Apparatus according to claim 10 in which each of said first, third and fourth comparators is provided with means for increasing the difference between the amplitudes at its reference and signal inputs when the amplitude at its signal input rises above the reference amplitude at its reference input.

13. Apparatus according to claim 10 in which each of said first, third and fourth comparators is provided with means for decreasing the amplitude at its reference input when the signal level at its signal input rises above the reference amplitude at its reference input.

14. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding;

in which said control means inclues means for sensing the output voltage of said generator and for overriding the operation of said amplification means causing the current in said field winding to be reduced to zero, whenever said output voltage exceeds a predetermined level; and in which said sensing means comprises means for comparing said output voltage of the generator with a reference and providing an output connected to override the operation of said amplification means whenever said output voltage of the generator exceeds said reference, and wherein said comparing means is a two-input amplifier in which the inputs have opposite effects on the output, one of the inputs of said amplifier being connected to receive a signal corresponding to said output voltage of the generator, and the other input of said amplifier being connected to receive said reference, and said amplifier has means responsive to its output for increasing the difference between the amplitudes at its inputs when the output voltage of the generator rises above said reference.

* * * * *